3,578,660
2-ACYLOXYCEPHALOSPORIN COMPOUNDS
Robin D. G. Cooper, Indianapolis, Ind., assignor to Eli Lilly and Company, Indianapolis, Ind.
No Drawing. Filed Oct. 7, 1968, Ser. No. 765,686
Int. Cl. C07d 99/24
U.S. Cl. 260—243                                          19 Claims

ABSTRACT OF THE DISCLOSURE

Reaction of a 7-(protected amino)cephalosporin ester with a lead tetraacylate compound, followed by deesterification, to yield the corresponding 2-acyloxy-7-(protected amino)cephalosporin compound which is useful as an antibiotic.

BACKGROUND OF THE INVENTION

Numerous cephalosporin compounds have significant antibiotic activity, and much art has developed relating to substituted cephalosporin substances. However, to date, no cephalosporin compound has been taught wherein there is a 2-substituent.

Lead tetraacylate compounds, typically lead tetraacetate, have been widely used as oxidizing agents, whereby a sulfide, even a cyclic sulfide, is oxidized to a sulfoxide. However, the reaction of lead tetraacylate compounds with a 7-(protected amino)cephalosporin ester in accordance with the present invention results in preparation of the corresponding 2-acyloxy-7-(protected amino)cephalosporin compound, preferentially to possible oxidation of the ring sulfur. Thus, the present invention provides unexpected and otherwise unavailable access to 2-substituted cephalosporin compounds.

BRIEF SUMMARY OF THE INVENTION

The present invention is directed, in one part, to the reaction of a 7-(protected amino)cephalosporin ester of the formula:

I 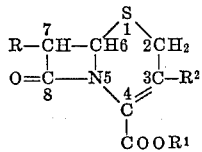

with a lead tetraacylate of the formula:

to yield the corresponding compound of the formula:

II 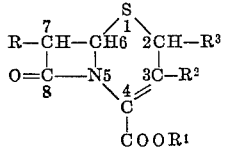

In the above and succeeding formulae in the present specification and claims, R represents a protected amino group; $R^1$ represents a residue of an ester forming alcohol; $R^2$ represents methyl or substituted methyl as hereinbelow defined; and $R^3$ represents alkanoyloxy of $C_2$-$C_8$ or cycloalkanoyloxy of $C_6$-$C_8$.

The compounds of this Formula II are useful as intermediates to be converted in standard procedures to the corresponding free acids:

III 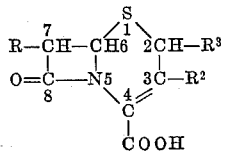

Many compounds of Formula III are useful as antibotics and can be employed as such in numerous embodiments, and the remaining compounds of Formula III can be employed as intermediates from which the antibiotically active compounds are prepared. The pharmaceutically acceptable salts of the antibiotically active compounds can also be used as antibiotics.

Thus, the present invention is also directed, in another part, to the novel compounds of Formulae II and III taken together, that, is compounds of the formula:

IV 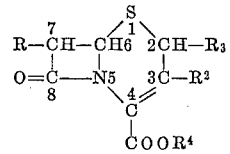

wherein $R^4$ represents hydrogen or $R^1$.

DETAILED DESCRIPTION OF THE INVENTION

Nomenclature

Specific starting materials and products of the process of this invention are named, for convenience, by use of the "cepham" nomenclature system. "Penam" nomenclature for the penicillins is described by Sheehan, Henery-Logan, and Johnson in the Journal of the American Chemical Society, 75, 3292, footnote 2 (1963) and has been adapted to the cephalosporins by Morin, Jackson, Flynn, and Roeske (Journal of the American Chemical Society, 84, 3400 [1962]). In accordance with these systems of nomenclature, "cepham" refers to the following saturated ring system:

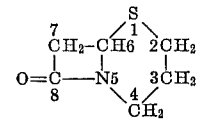

"Cephem" refers to the cepham ring structure containing a double bond, the position of which is indicated by a prefixed "Δ" with a superscript denoting the lowest numbered carbon atom to which the double bond is connected, or by the word "delta" with the same number relationship. Thus, for example, the following representative starting material in accordance with the present invention:

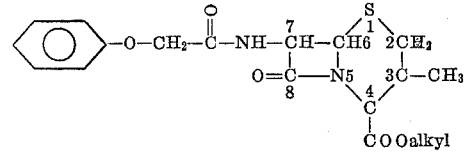

is named alkyl 7-(phenoxyacetamido) - 3 - methyl-$\Delta^3$-cephem-4-carboxylate. Other starting materials and products are correspondingly named.

Reactants

In the formulae employed herein, where $R^3$ is alkanoyloxy, the alkyl portions thereof can be either straight chain or branched chain alkyl.

The protected amino group designated as R can be any group in which the nitrogen atom is not itself reactive with the lead tetraacylate compound. Such protected amino groups are known, generally as well as in particular, in the cephalosporin art. The protected amino group can be, e.g., (triphenylmethyl)amino (tritylamino), (trimethylsilyl)amino, or as is most practical and preferred, an acylamido group. Many acylamido groups suitable for this purpose are already known in the cephalosporin antibiotic literature. However, preferred amino protecting groups are acylamido groups of the formula

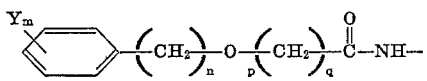

wherein each of *m*, *n*, and *p* represents an integer of from 0 to 1, both inclusive, and *q* represents an integer from 0 to 4, both inclusive, subject to the further limitation that when *p* represents 0, the sum of *n* and *q* is not more than 1; and Y represents fluoro, chloro, bromo, $C_1$–$C_3$ alkoxy, nitro, or trifluoromethyl. A few representative examples of such preferred acyl groups include benzamido,
phenylacetamido,
phenoxyacetamido,
(benzyloxy)acetamido,
3-(benzyloxy)propionamido,
3-phenoxypropionamido,
4-phenoxybutyramido,
(3-fluorophenoxy)acetamido,
(4-bromophenyl)acetamido,
(4-chlorophenoxy)acetamido,
3-(2-chlorobenzyloxy)propionamido,
(4-nitrophenoxy)acetamido,
(4-(trifluoromethyl)phenoxy)acetamido,
(4-methoxyphenyl)acetamido,
5-phenoxyvaleramido,
3-(4-isopropoxybenzyloxy)propionamido, and the like.

Other preferred protected amino groups are phthalimido:

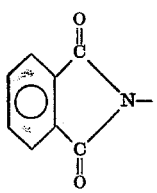

and the 7-substituent of Cephalosporin C treated to render inert those groups thereof (—COOH, —NH₂) which would otherwise be reactive with a lead tetraacylate. An exemplary resulting protected amino group is of the formula:

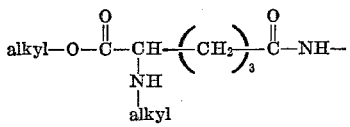

Numerous other compounds which form protected amino groups and which can be used in the R position are known in the prior penicillin art; e.g., those disclosed in the Behrens et al. U.S. Pat. Nos. 2,479,295 to 2,479,297; and 2,562,407 to 2,562,411; and 2,623,876.

The $R^1$ symbol represents the residue of an ester forming alcohol which residue is removable without degradation of the cephalosporin molecule. Removal can be achieved by the use of trifluoroacetic acid, alone or with benzene cosolvent; or by the use of zinc dust in an alkanoic acid such as formic acid, acetic acid, or a mixture of such acids; or by an equivalent method whereby the cephalosporin molecule is not degraded. The preferred ester groups are 2,2,2-trichloroethyl; benzyl, trimethylsilyl; methoxybenzyl; and benzhydryl.

As set forth hereinabove, the symbol $R^2$ represents methyl or substituted methyl. Where $R^2$ represents substituted methyl, the substituted methyl group can be a radical of the formula

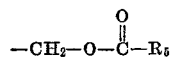

or a radical of the formula

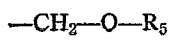

the symbol $R_5$ being defined hereinbelow. Cephalosporin compounds obtained by fermentation contain a 3-(acetoxymethyl) moiety. Suitable cephalosporin compounds containing the other substituted methyl groups are readily prepared beginning initially with 3-methyl-Δ³-cephem-4-carboxylate compounds:

V
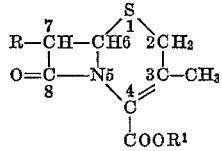

Such compounds are converted by known methods to 3-methyl-Δ²-cephem-4-carboxylate compounds:

VI
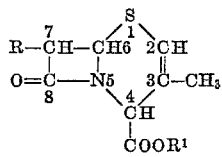

The conversion can be carried out, for example, by base treatment of the corresponding Δ³-cephem as described in Example 4 of U.S. Pat. 3,275,626.

These 3-methyl-Δ²-cephem-4-carboxylate compounds are reacted with N-bromosuccinimide, as brominating agent, which reaction results in the production of the corresponding 3-(bromomethyl)cephalosporin compound:

VII
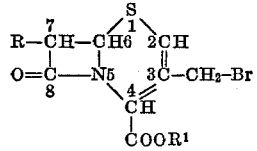

which then, by reaction with a selected nucleophilic compound, yields a 3-substituted methyl-Δ²-cephem-4-carboxylate compound.

Suitable nucleophilic compounds are
(1) Compounds of the formula

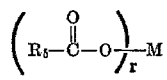

wherein *r* represents an integer equivalent to the valence of M; M is alkali metal or alkaline earth metal; and $R_5$ is hydrogen; $C_1$–$C_6$ alkyl; $C_5$–$C_7$ cycloalkyl; radical of the formula

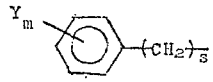

wherein Y represents, as hereinabove, fluoro, chloro, bromo, $C_1$–$C_3$ alkoxy, nitro, or trifluoromethyl; *m* represents, as hereinabove, 0 or 1; and *s* represents 0, 1, or 2. Compounds of this category are exemplified by the alkali metal or alkaline earth metal salts of formic, acetic, propionic, butyric, pentanoic, hexanoic, cyclopentanecarboxylic, and cyclohexanecarboxylic acid; and by the alkali metal or alkaline earth metal salts of benzoic acid, phenylacetic acid, 3-phenylpropionic acid, and substituted acids such as 4-(trifluoromethyl)benzoic acid, (3-nitrophenyl) acetic acid, (4-methoxyphenyl)acetic acid, (3-chlorophenyl)acetic acid, 2-4-fluorophenyl)propionic acid, and (4-bromophenyl)acetic acid.

Where such compounds of category (1) are reacted with the 3-(bromomethyl)cephalosporin compound described hereinabove, the resulting 3-substituted methyl 7-

(protected amino)cephalosporin compound is of the following formula:

VIII
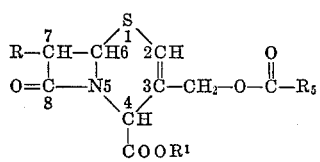

Also suitable as nucleophilic compounds with which the 3-(bromomethyl)cephalosporin can be reacted to obtain 3-substituted methyl starting materials are (2) Compounds of the formula $$(R^5\!-\!O)_rM$$

wherein $R^5$, M, and $r$ are as hereinabove defined.

Examples of such compounds include the alkali metal alkaline earth hydroxides and the alkali metal and alkaline earth metal salts of alcohols such as methanol, ethanol, isopropanol, tert-butanol, hexanol, cyclohexanol, cyclopentanol, cycloheptanol, phenol, benzyl alcohol, phenethyl alcohol, 4 - (trifluoromethyl)phenol, 3 - nitrophenol, 4-methoxyphenethyl alcohol, 4-fluorophenol, 2-chlorobenzyl alcohol, and 4-bromophenethyl alcohol.

Where such compounds of category (2) are reacted with the 3-(bromomethyl)cephalosporin compound described hereinabove, the resulting 3-substituted methyl 7-(protected amino)cephalosporin compound is of the following formula:

IX
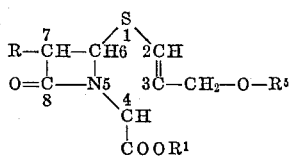

3-substituted methyl - $\Delta^2$ - cephem - 4 - carboxylate compounds of both Formulae VIII and IX are then isomerized back to corresponding $\Delta^3$-cephem compounds which serve as starting materials in accordance with the present invention. This isomeric conversion can be accomplished by heating in a weakly basic medium which causes the $\Delta^2$ double bond to partially migrate to the $\Delta^3$ position, providing an equilibrium mixture of the $\Delta^2$ substance and the $\Delta^3$ substance. Preferably, however, the $\Delta^2$-cephem is chemically converted to the corresponding $\Delta^3$-cephem by a process forming no part of this invention. That process involves (1) oxidation of the $\Delta^2$-sulfide substance to the corresponding $\Delta^3$-sulfoxide with a peracid, (2) reduction of the $\Delta^3$-sulfoxide substance with a reducing agent such as sodium bisulfite or sodium dithionite in the presence of an activator such as acetyl chloride, in organic solvent diluent such as acetic acid or dimethylformamide, to form the $\Delta^3$-sulfide.

Thus in the foregoing methods are prepared all of the starting materials wherein $R^2$ is substituted methyl.

Reaction conditions

The present reaction of the defined lead tetraacylate compound with the 7-(protected amino)cephalosporin ester compounds goes forward readily under a variety of reaction conditions. It is generally necessary for good yields that the reaction be conducted in a solvent. The choice of solvent is not critical; however, better results are achieved when the solvent employed is an ether, a tertiary amide, or a tertiary alcohol. Thus, suitable and preferred solvents include diethyl ether, methyl ethyl ether, tetrahydrofuran, tert-butanol, dimethylformamide, diethylene glycol dimethyl ether, and the like. Hexamethylphosphoramide can also be used.

The reaction goes forward under temperatures of a wide range; but below about room temperature, the reaction goes at only a disadvantageously slow rate. However, higher temperatures of 60–100° C. are preferred, and in fact, the reaction is most preferably conducted at reflux employing a solvent boiling within the range. The reaction consumes the reactants in amounts representing equimolecular proportions, but it is preferred to employ an excess of the lead tetraacylate reactant, such as from one to ten or more molecular proportions of the lead tetraacylate reactant per molecular proportion of the 7-(protected amino)cephalosporin ester reactant. The ratio which has been found to be most preferred is a ratio of one molecular proportion of the 7-(protected amino)cephalosporin ester reactant to 3 molecular proportions of the lead tetraacylate reactant. The manner of contacting the reactants is not critical, but higher yields are obtained when the contacting is carried out proportionwise over a period of time, the lead tetraacylate preferably being added portionwise to the 7-(protected amino)cephalosporin ester reactant.

Thus, in carrying out the reaction, is a preferred embodiment, the 7-(protected amino)cephalosporin reactant is mixed with a solvent, as discussed hereinabove, and the lead tetraacylate reactant thereafter added portionwise over a period of time; during the addition the reaction mixture is heated to the reaction temperature range and maintained thereat for the duration of the reaction. Separation and purification are carried out in conventional procedures.

Utility of products

The products prepared in accordance with the process of the present invention

II
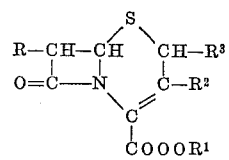

can subsequently be employed as intermediates to prepare the corresponding free acid compounds III
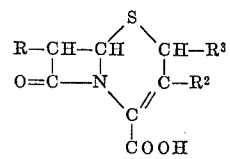

many of which are themselves useful as antibiotics. Thus, for example, the following compounds of formula III:

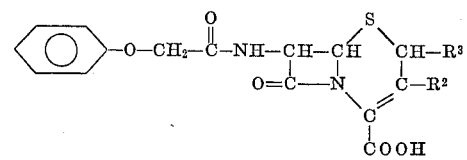

are useful as antibiotics. Deesterification can be accomplished as described hereinabove regarding $R^1$ in the definition of the reactants.

In addition to the deesterification, the protected amino group can be removed to obtain the corresponding 7-amino compound, which can then be acylated with another acyl group. The precise manner in which the removal and/or replacement of the acyl group are conducted is not critical, such reactions being known in the penicillin and cephalosporin arts. Attention is directed to U.S. Pat. Nos. 3,218,-318 and 3,382,241.

In an improved method for the removal of an acyl group, applicable where $R_2$ is methyl, (a) a 2-acyloxy-7-(acylamido)-3-methylcephalosporin ester product of the present invention is reacted with a phosphorus halide such as phosphorus pentachloride ($PCl_5$) or phosphorus oxychloride ($POCl_3$), or an equivalent halogen source, at an elevated temperature of from about 40° C. to about 80° C. in the presence of about an equivalent of a basic neutralizing agent for each 1–1.3 mole of phosphorus halide used, in substantially anhydrous solution to form the corresponding imino-halide; (b) the corresponding imino-halide obtained as described in step (a) is commingled or mixed with an alcohol to cleave the imino-halide group to yield the 2-acyloxy-7-amino-3-methylcephalosporin ester, and an ester by-product derived from the 7-acyl group and the alkanol. The 2-acyloxy-7-amino - 3 - methylcephalosporin ester product is readily separated from the reaction mixture containing the ester by-product (which is extractable at acid pH) either by extraction from water at near neutral pH with an organic solvent or by adding a sulfonic acid to a solution of this product to precipitate the corresponding sulfonate salt of the 7 - amino-3-methylcephalosporin ester product.

By whatever method obtained, the resulting 2-acyloxy-7-amino compounds can then be acylated, as discussed above, to introduce an acyl group which in known cephalosporin compounds confers antibiotic activity. Numerous such acyl groups are known; attention is directed to the (2-thienyl)acetyl and (phenylmercapto)acetyl groups. When introduced into the 2-acyloxy-7-amino compounds, there are obtained the corresponding compounds of the following formulae:

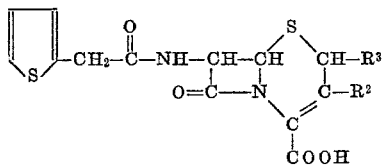

and

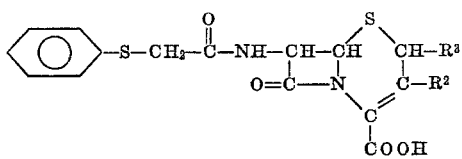

These 7-(α-(2-thienyl)acetamido)-2-acyloxycephalosporin and 7-(α-(phenylmercapto)acetamido)-2-acyloxycephalosporin compounds are useful as antibiotics.

Those products of the present invention wherein the protected amino group is (trimethylsilyl)amino are preferably treated in a different order, that is, acylated first, as discussed hereinabove, and then treated with a lower-alkanol to remove the (trimethylsilyl) group.

Thus, all of the 2-acyloxycephalosporin ester compounds produced by the process of the present invention are useful, those wherein the protected amino group is phenoxyacetamido, as intermediates which by deesterification yield useful antibiotics; and those wherein the protected amino group is a moiety other than phenoxyacetamido, as intermediates which by deesterification and replacement of the protected amino group with a (2-thienyl)acetyl, (phenylmercapto)acetyl, or other group, yield useful antibiotics.

In the employment of the free acid compounds of the present invention, either as such or in the form of pharmaceutically acceptable salts thereof, the compounds can be administered by a plurality of routes, but are preferably administered by intramuscular injection. Doses of from 250 milligrams to 1 gram usually suffice.

EXAMPLES

The following examples illustrate the present invention and will enable those skilled in the art to practice the same.

Example 1.—Preparation of p-methoxybenzyl 2-acetoxy-7 - (phenoxyacetamido) - 3 - methyl - $\Delta^3$ - cephem-4-carboxylate p-Methoxybenzyl 7 - (phenoxyacetamido)-3-methyl-$\Delta^3$-cephem-4-carboxylate (3.06 grams; 0.007 mole) was refluxed, with stirring, with 250 milliliters of tert-butanol and 3.1 grams of lead tetraacetate (0.007 mole). After one hour, another 3.1 grams of lead tetraacetate were added; and after an additional half hour, a final addition of 3.1 grams of lead tetraacetate was made and the mixture refluxed for atnother half hour. The reaction mixture was stirred for an hour and then filtered and the filtrate added to an equal volume of ethyl acetate. The resulting mixture was washed repeatedly with water, then dried and solvent evaporated in vacuo to obtain the desired semi-solid product residue. This product residue was chromatographed using a 1:3 mixture of ethyl acetate and benzene. As a result of these operations, 6 fractions were obtained.

NMR analysis was conducted on the fractions, and one of the fractions was confirmed as being the desired p-methoxybenzyl 2 - acetoxy - 7 - (phenoxyacetamido)-3-methyl-$\Delta^3$-cephem - 4 - carboxylate product. Confirmation arose in that the doublet characteristic of the methylene group at the 2-position of the cephalosporin starting material, and centered at 203 Hz., was not present; rather, NMR on the product-containing fraction showed a singlet at 128 Hz., indicating the 2-acyloxy group, and a singlet at 382 Hz., indicating the remaining hydrogen at the 2-position.

In addition, elemental analysis was conducted on the product:
Calcd. for $C_{26}H_{26}N_2O_8$ (percent): C, 59.31; H, 4.98; N, 5.32. Found (percent): C, 58.93; H, 5.33; N, 4.62.

Example 2.—Preparation of 2-acetoxy-7-(phenoxyacetamido)-3-methyl-$\Delta^3$-cephem-4-carboxylic acid p - Methoxybenzyl 2 - acetoxy-7-(phenoxyacetamido)-3-methyl-$\Delta^3$-cephem-4-carboxylate (120 milligrams) was dissolved in 22 milligrams of anisole and 10 cc. of dry benzene. Trifluoroacetic acid (0.5 milliliter) was added, with stirring, and stirring was continued for 2 hours at room temperature under nitrogen. The reaction mixture was then evaporated to yield a product residue.

An amount of ethyl acetate was then added to the product residue and the resulting mixture subsequently extracted three times with aqueous bicarbonate solution. The extract was layered with an aqual amount of ethyl acetate, cooled in an ice bath, and slowly adjusted to pH of 2.2 with dilute hydrochloric acid. Ethyl acette was then removed and the aqueous layer again extracted with ethyl acetate. The extracts were washed with saturated sodium chloride solution, dried with magnesium sulfate, filtered, and evaporated to yield the desired 2-acetoxy-7-(phenoxyacetamido) - 3 - methyl - $\Delta^3$-cephem-4-carboxylic acid product.

A bioautogram was run on the product, using a descending technique with a 92/8 mixture of methyl ethyl ketone/water. Complete inhibition of Bacillus subtilis at pH 6.5 was obtained.

Examples 3–5

In further exemplary operations, p-methoxybenzyl 7-(phenoxyacetamido) - 3 - methyl - $\Delta^3$ - cephem - 4 - carboxylate was reacted with lead tetraacetate in three separate reactions, each one employing a different solvent. The three solvents evaluated were dimethylformamide, tetrahydrofuran, and tert-butanol. In these evaluations, 204 milligrams of the starting cephalosporin ester compound (0.43 millimole) were dissolved (or suspended in the case of the tert-butanol) at room temperature, 221 milligrams of lead tetraacetate (0.5 millimole) added, and the resulting reaction mixture stirred overnight. On successive mornings thereafter, an additional 221 milligrams of lead tetraacetate were added to each of the reaction mixtures until a total of three equivalents of the lead tetraacetate had been added to each of the reaction mixtures. The foregoing operations resulted in the precipitation in each of the reaction mixtures of the desired p-methoxybenzyl 2-acetoxy - 7 - (phenoxyacetamido)-3-methyl-$\Delta^3$-cephem-4-carboxylate product. The products were separated by filtration, mixed with water, and then extracted with ethyl acetate. Each extract was washed with several portions of water, dried, and solvent removed by evaporation to isolate the product. The amount of product obtained with each of the candidate solvents was as follows:

| | Milligrams |
|---|---|
| Dimethylformamide | 117.3 |
| Tetrahydrofuran | 200.0 |
| Tert-butanol | 180.0 |

The identity of each of the products was confirmed by NMR analysis.

EXAMPLES 6–8

Each of the products obtained as reported in Examples 3–5 was subsequently hydrolyzed in accordance with the procedures of Example 2. The resulting 2-acetoxy-7-(phenoxyacetamido) - 3 - methyl-$\Delta^3$-cephem-4-carboxylic acid products were obtained in the following yields:

| | Milligrams |
|---|---|
| Dimethylformamide | 19.2 |
| Tetrahydrofuran | 40.2 |
| Tert-butanol | 50.2 |

Example 9.—Preparation of benzyl 2-acetoxy-7-(phenoxyacetamido)-3-methyl-$\Delta^3$-cephem-4-carboxylate Benzyl 7 - (phenoxyacetamido) - 3 - methyl-$\Delta^3$-cephem-4-carboxylate (6.57 grams; 0.015 mole) was refluxed for an hour, with stirring, with tert-butanol (350 milliliters) and lead tetraacetate (6.65 grams; 0.015 mole). The reaction mixture was then cooled for a while, another 6.65 gram portion of lead tetraacetate added, and the mixture refluxed for one-half hour and then cooled. Subsequently, yet another 6.65 gram portion of lead tetraacetate was added and the mixture again refluxed for one-half hour and cooled. The reaction mixture was then filtered and the filtrate mixed with 400 milliliters of cold water and extracted with two portions of ethyl acetate.

The extract was washed several times with cold water, dried, and then evaporated to yield a product residue. This product residue was dissolved in benzene and solvent evaporated, yielding the desired benzyl 2-acetoxy-7-(phenoxyacetamido) - 3 - methyl - $\Delta^3$ - cephem - 4 - carboxylate as a crystalline product. Identity of the product was confirmed by NMR.

Calc.d for $C_{25}H_{24}N_2O_7S$ (percent): C, 60.48; H, 4.87; N, 5.64. Found (percent): C, 60.28; H, 4.86; N, 5.82.

Example 10.—Preparation of 2-acetoxy-7-(phenoxyacetamido)-3-methyl-$\Delta^3$-cephem-4-carboxylic acid Benzyl 2 - acetoxy-7-(phenoxyacetamido)-3-methyl-$\Delta^3$-cephem-4-carboxylate (100 milligrams) was dissolved in 20 milliliters of etthyl acetate. Palladium black (125 milligrams) was added and the mixture hydrogenated overnight, consuming 24.5 milliliters. The reaction mixture, containing the desired 2-acetoxy-7-(phenoxyacetamido)-3-methyl-$\Delta^3$-cephem-4-carboxylic acid, was worked up in standard procedures to separate the product.

A bioautogram was run on the product, using a descending technique with a 92/8 mixture of methyl ethyl ketone/water. Complete inhibition of *Bacillus subtilis* at pH 6.5 was obtained.

Example 11.—Preparation of (2,2,2-trichloroethyl) 2 - acetoxy - 7 - (phenoxyacetamido)-3-methyl-$\Delta^3$-cephem-4-carboxylate (2,2,2-trichloroethyl) 7-(phenoxyacetamido)-3-methyl-$\Delta^3$-cephem - 4 - carboxylate (1.437 grams; about 0.003 mole), lead tetraacetate (1.5 grams; about 0.003 mole), and tert-butanol (50 milliliters) were refluxed for four hours. The reaction mixture was then cooled to room temperature and filtered to separate the desired (2,2,2-trichloroethyl) 2 - acetoxy-7-(phenoxyacetamido)-3-methyl-$\Delta^3$-cephem-4-carboxylate product. This separated product was then dissolved in methanol, filtered through charcoal, and the solvent evaporated to separate the desired (2,2,2-trichloroethyl 2-acetoxy-7-(phenoxyacetamido)-3-methyl-$\Delta^3$-cephem-4-carboxylate product as a purified product. It was chromatographed on a column with methanol and chloroform. The eluates were as follows:

| | Grams |
|---|---|
| Methanol | 840 |
| Chloroform | 600 |

Both product substances were subjected to NMR analysis. The analysis of the methanol eluate showed 30 percent of the starting material (2,2,2-trichloroethyl) 7-(phenoxyacetamido) - 3 - methyl-$\Delta^3$-cephem-4-carboxylate), and 70 percent of the desired product, (2,2,2-trichloroethyl) 2-acetoxy-7-(phenoxyacetamido) - 3 - methyl-$\Delta^3$-cephem-4-carboxylate. Analysis of the chloroform eluate showed 45 percent of the starting material and 55 percent of the product.

The eluates were then combined and chromatographed on silica with a 20/80 mixture of ethyl acetate and benzene. Five fractions were obtained and each subjected to NMR analysis. The analysis showed that the first fraction was essentially the starting material, whereas the second and the third fractions were the desired (2,2,2-trichloroethyl) 2-acetoxy-7-(phenoxyacetamido) - 3 - methyl-$\Delta^3$-cephem-4-carboxylate product. These two fractions were combined, and after recrystallization from methylene chloride/ether, the combined product consisted of colorless prisms, M.P. 157° C.

Examples 12–13

2,2,2-trichloroethyl 7-(phenylacetamido) - 3 - acetoxymethyl)-$\Delta^3$-cephem-4-carboxylate is refluxed with lead tetrapropionate in tetrahydrofuran to yield 2,2,2-trichloroethyl 2-propionyloxy - 7 - (phenylacetamido)-3-(acetoxymethyl)-$\Delta^3$-cephem-4-carboxylate product which by deesterification with zinc dust in acetic acid results in the corresponding free acid, 2-propionyloxy-7-(phenylacetamido)-3-(acetoxymethyl)-$\Delta^3$-cephem-4-carboxylate acid.

Examples 14–15

Benzhydryl 7 - (benzyloxyacetamido)-3-(methacryloyloxymethyl)-$\Delta^3$-cephem-4-carboxylate is reacted with lead tetracyclopentanoate in diethyl ether, at reflux, to yield benzhydryl 2-cyclopentanoyloxy-7-(benzyloxyacetamido)-3 - (methacryloyloxymethyl)-$\Delta^3$-cephem-4-carboxylate, which by deesterification with trifluoroacetic acid yields the corresponding free acid, 2-cyclopentanoyloxy-7-(benzyloxyacetamido) - 3 - methacryloyloxymethyl)-$\Delta^3$-cephem-4-carboxylic acid.

Examples 16–17

Benzyl 7-(3-phenoxypropionamido)-3-methyl-$\Delta^3$-cephem-4-carboxylate is reacted with lead tetrahexanoate in dimethylformamide to yield benzyl 2-hexanoyloxy-7-(3-phenoxypropionamido)-3-methyl-$\Delta^3$-cephem-4 - carboxylate, the ester group of which is thereafter cleaved to yield the corresponding 2 - hexanoyloxy - 7 - (3-phenoxypropionamido)-3-methyl-$\Delta^3$-cephem-4-carboxylic acid.

Examples 18–19

Benzyl 7-(phenoxyacetamido)-3-(hexanoyloxymethyl)-$\Delta^3$-cephem-4-carboxylate is reacted with lead tetraacetate in diethylene glycol dimethyl ether, at reflux,to yield benzyl 2-acetoxy - 7 - (phenoxyacetamido)-3-(hexanoyloxymethyl)-$\Delta^3$-cephem-4-carboxylate, which is then deesterified with zinc dust in formic acid to yield the corresponding 2-acetoxy - 7 - (phenoxyacetamido)-3-(hexanoyloxymethyl)-$\Delta^3$-cephem-4-carboxylic acid.

Examples 20–21

Trimethylsilyl 7 - (4-bromophenyl)-acetamido)-3-(propionyloxymethyl)-$\Delta^3$-cephem-4-carboxylate is reacted with lead tetrakis(2-ethylhexanoate), in tert-butanol, at reflux, to yield trimethylsilyl 2-(2-ethylhexanoyloxy)-7-((4-bromophenyl)acetamido)-3-(propionyloxymethyl)-$\Delta^3$ - cephem-4-carboxylate, which is then deesterified to yield the corresponding 2-(2-ethylhexanoyloxy)-7-((4-bromophenyl)acetamido)-3-(propionyloxymethyl) - $\Delta^3$ - cephem - 4 - carboxylic acid.

Examples 22–23 p-Methoxybenzyl 7-(phenoxyacetamido)-3-(methoxymethyl)-Δ³-cephem-4-carboxylate is reacted with lead tetrabutyrate, in tert-butanol, at reflux, to yield p-methoxybenzyl 2-butyryloxy-7-(phenoxyacetamido)-3-(methoxymethyl)-Δ³-cephem-4-carboxylate, which is then deesterified to yield the corresponding 2-butyryloxy-7-(phenoxyacetamido)-3-methoxymethyl)-Δ³-cephem-4-carboxylic acid.

Examples 24–28

Yet other representative products prepared in accordance with the present invention include the following:

2,2,2-trichloroethyl 2-octanoyloxy-7-(4-(3-methylphenoxy)-butyramido)-3-(acetoxymethyl)-Δ³-cephem-4-carboxylate.
benzyl 2-valeryloxy-7-(3-(3-nitrophenoxy)propionamido)-3-(acetoxymethyl)-Δ³-cephem-4-carboxylate.
2-isobutyryloxy-7-((4-methoxyphenyl)acetamido)-3-(cyclohexyloxymethyl)-Δ³-cephem-4-carboxylic acid.
p-methoxyphenyl 2-(4-methylvaleryloxy)-7-(4-phenoxybutyramido)-3-methyl-Δ³-cephem-4-carboxylate.
benzhydryl 2-cyclohexanoyloxy-7-(3-phenoxypropionamido)-3-(3-chlorobenzyloxymethyl)-Δ³-cephem-4-carboxylate.

I claim:
1. A process which comprises reacting
(1) a cephalosporin ester compound of the formula

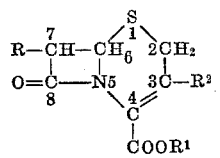

wherein

R represents a protected amino group which is
(triphenylmethyl)amino,
phthalimido,
a group of the formula

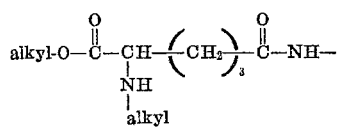

or a group of the formula

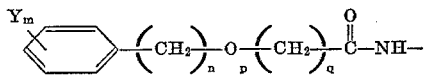

wherein each of $m$, $n$, and $p$ represents an integer of from 0 to 1, both inclusive, and $q$ represents an integer of from 0 to 4, both inclusive, subject to the further limitation that when p represents 0, the sum of $n$ and $q$ is not more than 1; and Y represents fluoro, chloro, bromo, $C_1$–$C_3$ alkoxy, nitro, or trifluoromethyl;
R¹ represents 2,2,2-trichloroethyl, benzyl, methoxy-benzyl, or benzhydryl; and
R² represents methyl,

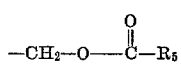

or —CH₂—O—R₅; wherein R₅ represents hydrogen, $C_1$–$C_6$ alkyl, $C_5$–$C_7$ cycloalkyl, radical of the formula

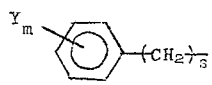

wherein Y represents, as hereinabove, fluoro, chloro, bromo, $C_1$–$C_3$ alkoxy, nitro, or trifluoromethyl, $m$ represents, as hereinabove, 0 or 1, and $s$ represents 0, 1, or 2,
with
(2) a lead tetraacylate compound of the formula Pb(R₃)₄ wherein R₃ represents alkanoyloxy of $C_2$–$C_8$ or cycloalkanoyloxy of $C_6$–$C_8$.

2. The process of claim 1 wherein the lead tetraacylate compound is lead tetraacetate.
3. The process of claim 2 wherein the cephalosporin ester compound is p-methoxyphenyl 7-(phenoxyacetamido)-3-methyl-Δ³-cephem-4-carboxylate.
4. The process of claim 2 wherein the cephalosporin ester compound is p-methoxybenzyl 7-(phenoxyacetamido)-3-(acetoxymethyl)-Δ³-cephem-4-carboxylate.
5. The method of claim 1 wherein the protected amino group is an acylamido group of the formula

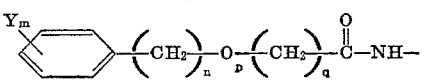

wherein each of $m$, $n$, and $p$ represents an integer of from 0 to 1, both inclusive, and $q$ represents an integer of from 0 to 4, both inclusive, subject to the further limitation that when $p$ represents 0, the sum of $n$ and $q$ is not more than 1; and Y repersents fluoro, chloro, bromo, $C_1$–$C_3$ alkoxy, nitro, or trifluoromethyl.
6. The compound of the formula

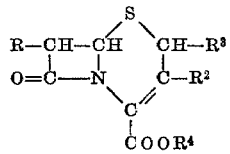

wherein
R represents a protected amino group which is
(triphenylmethyl)amino,
phthalimido,
a group of the formula

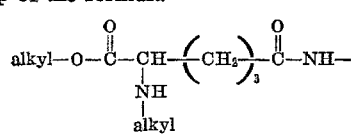

or a group of the formula

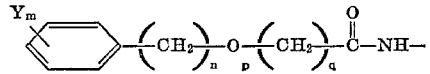

wherein each of $m$, $n$, and $p$ represents an integer of from 0 to 1, both inclusive, and $q$ represents an integer of from 0 to 4, both inclusive, subject to the further limitation that when $p$ represents 0, the sum of $n$ and $q$ is not more than 1; and Y represents fluoro, chloro, bromo, $C_1$–$C_3$ alkoxy, nitro, or trifluoromethyl;
R² represents methyl,

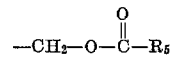

or —CH₂—O—R₅, wherein R₅ represents hydrogen, $C_1$–$C_6$ alkyl, $C_5$–$C_7$ cycloalkyl, radical of the formula

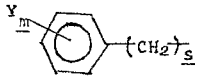

wherein Y represents, as hereinabove, fluoro, chloro, bromo, $C_1$–$C_3$ alkoxy, nitro, or trifluoromethyl, $m$ represents, as hereinabove, 0 or 1, and $s$ represents 0, 1, or 2;
R³ represents alkanoyloxy of $C_2$–$C_8$ or cycloalkanoyloxy of $C_6$–$C_8$; and
R⁴ represents hydrogen, 2,2,2-trichloroethyl, benzyl, methoxybenzyl, or benzhydryl.

7. The compound of claim 6 wherein the protected amino group is a moiety of the following formula:

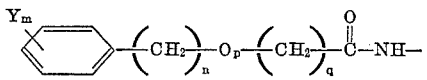

wherein each of *m*, *n*, and *p* represents an integer of from 0 to 1, both inclusive; and *q* represents an integer of from 1 to 4, both inclusive, subject to the further limitation that when *p* represents 0, the sum of *n* and *q* is not more than 1; and Y is as hereinabove defined.

8. The compound of claim 7 wherein $R^4$ is p-methoxybenzyl.

9. The compound of claim 8 wherein $R^4$ represents p-methoxybenzyl, $R^3$ represents acetoxy, R represents (phenoxyacetamido), and $R^2$ represents methyl, namely p-methoxybenzyl 2 - acetoxy - 7 - (phenoxyacetamido) - 3-methyl-$\Delta^3$-cephem-4-carboxylate.

10. The compound of claim 8 wherein $R^4$ represents, 2,2,2 - trichloroethyl, $R^3$ represents acetoxy, R represents (phenoxyacetamido), and $R^2$ represents methyl, namely 2,2,2 - trichloroethyl 2 - acetoxy - 7-(phenoxyacetamido)-3-methyl-$\Delta^3$-cephem-4-carboxylate.

11. The compound of claim 8 wherein $R^4$ represents benzyl, $R^3$ represents acetoxy, R represents (phenoxyacetamido), and $R^2$ represents methyl, namely benzyl 2-acetoxy - 7 - (phenoxyacetamido) - 3 - methyl - $\Delta^3$-cephem-4-carboxylate.

12. The compound of claim 6 wherein $R^4$ represents p-methoxybenzyl, $R^3$ represents acetoxy, R represents (5-amino - 5 - carboxyvaleramido), and $R^2$ represents methyl, namely p-methoxybenzyl - 2 - acetoxy-7-(5-amino-5-carboxyvaleramido) - 3 - methyl - $\Delta^3$ - cephem - 4 - carboxylate.

13. The compound of claim 8 wherein $R^4$ represents 2,2,2 - trichloroethyl, $R^3$ represents propionyloxy, R represents (phenoxyacetamido), and $R^2$ represents (acetoxymethyl), namely 2,2,2 - trichloroethyl 2 - propionyloxy-7-(phenoxyacetamido) - 3 - (acetoxymethyl) - $\Delta^3$ - cephem-4-carboxylate.

14. The compound of claim 8 wherein $R^4$ represents p-methoxybenzyl, $R^3$ represents acetoxy, R represents (phenoxyacetamido), and $R^2$ represents acetoxymethyl, namely p-methoxybenzyl 2 - acetoxy - 7 - (phenoxyacetamido) - 3 - (acetoxymethyl)-$\Delta^3$ - cephem - 4 - carboxylate.

15. The compound of claim 6 wherein $R^4$ is hydrogen.

16. The compound of claim 15 wherein $R^3$ represents acetoxy, R represents (phenoxyacetamido), and $R^2$ represents methyl, namely 2-acetoxy-7-(phenoxyacetamido)-3-methyl-$\Delta^3$-cephem-4-carboxylic acid.

17. The compound of claim 15 wherein $R^3$ represents acetoxy, R represents (5 - amino - 5 -carboxyvaleramido), and $R^2$ represents methyl, namely 2 - acetoxy - 7 - (5-amino - 5 - carboxyvaleramido) - 3 - methyl-$\Delta^3$-cephem-4-carboxylic acid.

18. The compound of claim 15 wherein $R^3$ represents propionyloxy, R represents (phenoxyacetamido), and $R^2$ represents (acetoxymethyl), namely 2 - propionyloxy - 7 - (phenoxyacetamido) - 3 - (acetoxymethyl) - $\Delta^3$-cephem-4-carboxylic acid.

19. The compound of claim 15 wherein $R^3$ represents acetoxy, R represents (phenoxyacetamido), and $R^2$ represents (acetoxy-methyl), namely 2 - acetoxy - 7 - (phenoxyacetamido) - 3 - (acetoxymethyl) - $\Delta^3$ - cephem-4-carboxylic acid.

No references cited.

NICHOLAS S. RIZZO, Primary Examiner

U.S. Cl. X.R.

260—999